J. VOGT.
HOOF PAD.
APPLICATION FILED JAN. 10, 1914.
1,121,694.
Patented Dec. 22, 1914.
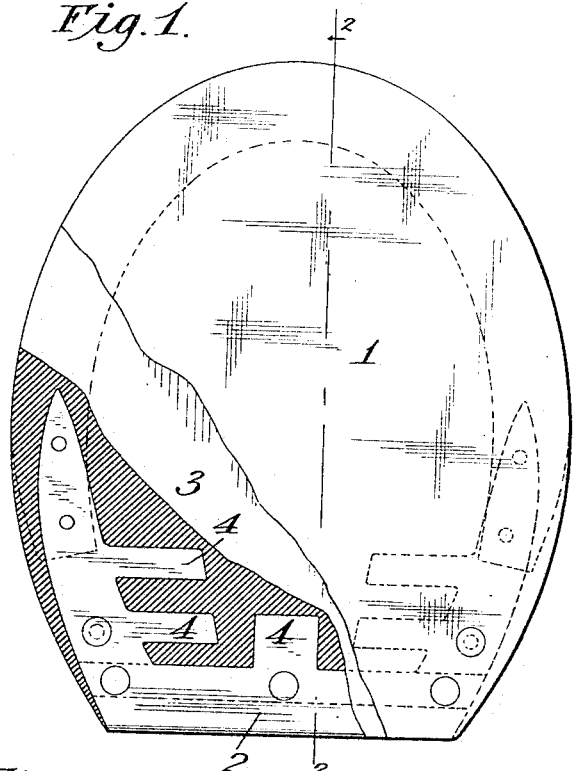
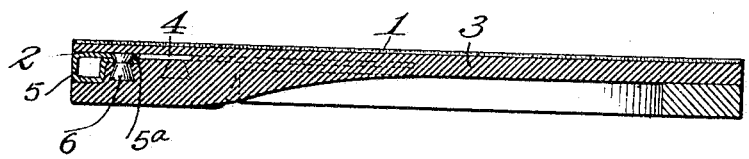
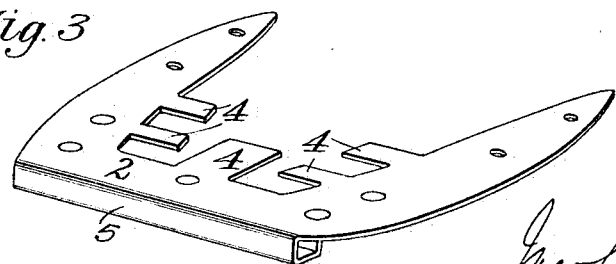
Witnesses
C. B. Bull
Charles Lowell Howard
Inventor
Jacob Vogt
By
Attorneys

UNITED STATES PATENT OFFICE.

JACOB VOGT, OF NEW ROCHELLE, NEW YORK.

HOOF-PAD.

1,121,694. Specification of Letters Patent. Patented Dec. 22, 1914.

Application filed January 10, 1914. Serial No. 811,472.

*To all whom it may concern:*

Be it known that I, JACOB VOGT, a citizen of the United States, residing at New Rochelle, in the county of Westchester and State of New York, have invented new and useful Improvements in Hoof-Pads, of which the following is a specification.

My invention relates to hoof pads in which rubber is an element, and is designed to provide for the foot of the animal a firm and secure base so that the foot shall rest upon or strike the earth with uniform pressure. It is known that horses are subject to many diseases by reason of the unequal and variable foundation provided by the ordinary shoe mainly because of a lack of support at the heel; and my improvement is designed to provide that complete uniformity of pressure, especially at that point, which shall prevent the distortion of the foot productive of such ailments. Furthermore, by the use of my invention the foot of an animal afflicted as above, as by corns produced by contraction or the like, will be restored to normal condition.

In carrying out my invention I employ a rubber pad which covers the entire base of the hoof and which is usually combined with a covering of canvas, leather or other suitable composition which is in contact with the foot. Between the rubber and such covering a plate, preferably of steel, is inserted at the heel, the member of the plate at that point being straight and having at each side branches which project toward the toe. To this plate the rubber is molded so as to be perfectly affixed thereto, this result being effected through the agency of parts of the plate which project inwardly and are embedded in the rubber. The plate where in contact with the rubber may be, and preferably is, provided with recesses produced by flanges or the like, in which the rubber is seated in the act of molding. The side members of this bar, practically of U shape, are adapted to be covered for some distance by the shortened ends of the heel of the ordinary shoe, the whole being nailed to the hoof in the usual manner. The entire under surface of the heel part of the pad is preferably flush with the under side of the shoe. However, a certain amount of projection of the heel part of the pad below the under surface of the shoe may be found advisable in some cases, this being determined by the character of the foot to which the device is to be applied.

In the accompanying drawing, Figure 1 is a plan of that side of my improved hoof-pad upon which rests the foot of the animal, the figure being broken away so as to expose certain parts which would otherwise be concealed. Fig. 2 is a section on the line $x—x$. Fig. 3 shows a detail hereinafter described.

1 shows a sheet of canvas, leather, composition or other substantially flexible material upon which rests the foot of the animal.

2 indicates a metallic bar of substantially U shape, and by preference made of steel. This bar extends across the heel and projects forward at each side toward the toe.

3 represents a body of rubber which is molded upon and around the bar 2 so as to be intimately interlocked therewith. This bar is provided with inner projections 4 at the sides and rear which, becoming embedded in the rubber, increase the hold of the bar thereon and prevent dislodgment. The projections or anchors 4 integral with the bar form an inseparable connection with the rubber when the latter is molded or poured around the metal. It is intended that there shall be a perfect and immovable connection between the rubber, the metal and the canvas.

It is understood that the ordinary shoe is shortened or cut off at the heel parts, and that the shortened ends of the shoe will overlap the outer ends of the side members of the bar 2, as indicated in dotted lines in Fig. 1, and also seen in Fig. 2.

The metal bar 2 is strengthened at the heel part by a duplication of the metal at that point as shown at 5. This duplicated portion has an inturned flange $5^a$ in which are countersunk holes. Frusto-conical, or anchoring rivets 6 are sunk in the rubber body 3, while their heads passing through said holes are riveted over upon the metallic bar 2, as shown more particularly in Fig. 2, thus effecting a firm joint between the bar and the rubber.

It may be stated that in applying my improved pad to the foot of an animal I first level the hoof. After this I obtain the correct fit of the iron shoe. After applying tar and oakum to the foot I put on the pad and the shoe and nail fast. After this I finish down and clench the nails. The pad is thus seen to be easily applied to the foot of the animal. It will be apparent that a uniform and level base is formed, giving the necessary elasticity, although the entire device is rigid and immovable in its members. The canvas or other flexible body mentioned is attached to the rubber and to the metal by riveting or otherwise, so that the entire pad is in practice but one element ready for application to the foot with the ordinary shoe.

I claim as my invention:—

A composite and unitary hoof pad consisting of an integral U-shaped perforated metal bar having a part extending across the heel and side portions reaching toward the toe, the said side portions being adapted to be overlapped by the heel of the shoe, said metallic bar being further provided with inturned projections or anchors, and the heel part of said bar being strengthened by duplication upon itself and furnished with an inturned flange, combined with a rubber body of shape conforming to that of the foot of the animal and molded around said metallic bar, frusto-conical rivets sunk in the rubber and extended through said inturned flange and the main part of said metallic bar and riveted over upon the latter, and a body of flexible material conforming to the shape and covering the upper surface of said rubber body, substantially as set forth.

In testimony whereof I affix my signature in presence of two witnesses.

JACOB VOGT.

Witnesses:
C. B. BULL,
CHARLES LOWELL HOWARD.

Copies of this patent may be obtained for five cents each, by addressing the "Commissioner of Patents, Washington, D. C."